(12) United States Patent
Beha et al.

(10) Patent No.: US 9,297,423 B2
(45) Date of Patent: Mar. 29, 2016

(54) STATOR COUPLING

(71) Applicant: SICK STEGMANN GmbH, Donaueschingen (DE)

(72) Inventors: Marc Beha, Donaueschingen (DE); Eduard Tabler, Donaueschingen (DE); Jurgen Girke, Donaueschingen (DE)

(73) Assignee: SICK STEGMANN GMBH, Donaueschingen (DE)

( * ) Notice: Subject to any disclaimer, the term of this patent is extended or adjusted under 35 U.S.C. 154(b) by 251 days.

(21) Appl. No.: 13/943,083

(22) Filed: Jul. 16, 2013

(65) Prior Publication Data
US 2014/0037368 A1 Feb. 6, 2014

(30) Foreign Application Priority Data
Jul. 31, 2012 (EP) .................................... 12178652

(51) Int. Cl.
*F16D 1/12* (2006.01)
*G01D 5/244* (2006.01)
*G01D 5/347* (2006.01)

(52) U.S. Cl.
CPC .............. *F16D 1/12* (2013.01); *G01D 5/24442* (2013.01); *G01D 5/347* (2013.01); *Y10T 403/45* (2015.01); *Y10T 403/64* (2015.01)

(58) Field of Classification Search
CPC ........ F16D 1/12; G01D 5/02; G01D 5/24428; G01D 5/24433; G01D 5/24442; G01D 5/347; G01D 5/3474; G01D 5/34738

USPC .................. 403/220, 286, 291, 335, 337, 404
See application file for complete search history.

(56) References Cited

U.S. PATENT DOCUMENTS

| 5,219,314 A | * | 6/1993 | Her et al. .......................... 464/84 |
| 5,771,594 A | * | 6/1998 | Feichtinger ................... 33/1 PT |
| 6,735,877 B2 | * | 5/2004 | Torr .............................. 33/1 PT |

FOREIGN PATENT DOCUMENTS

| DE | 8915109 U1 | | 2/1990 |
| DE | 10203278 | * | 9/2002 |
| DE | 102006038981 A1 | | 3/2008 |
| EP | 0762081 A1 | | 3/1997 |
| EP | 1203203 A1 | | 5/2002 |
| EP | 1353150 A2 | | 10/2003 |
| EP | 1557643 | * | 7/2005 |
| WO | WO 2010000520 | * | 1/2010 |
| WO | WO 2010012581 | * | 2/2010 |

* cited by examiner

*Primary Examiner* — Josh Skroupa
(74) *Attorney, Agent, or Firm* — Nath, Goldberg & Meyer; Jerald L. Meyer; Rury L. Grisham

(57) ABSTRACT

A stator coupling for the torsionally rigid connection of two components allows radial and axial relative movements within tolerance limits has a base surface (10) with first (18.1, 18.2) and second (28) lugs. The second lugs (28) are positioned at the straight-line edges between the assembly points (26, 42). Bent edges (30, 32) parallel to one respective edge are bent away at least twice, so that a flange (34.1, 34.2, 34.3, 34.4) surface-parallel to the base surface (10) is formed. Two second lugs, are positioned at edges following one another in the peripheral direction, and overlap with mutually facing ends of their flanges and these ends each together form one of a set of second assembly points (42.1, 42.2).

14 Claims, 5 Drawing Sheets

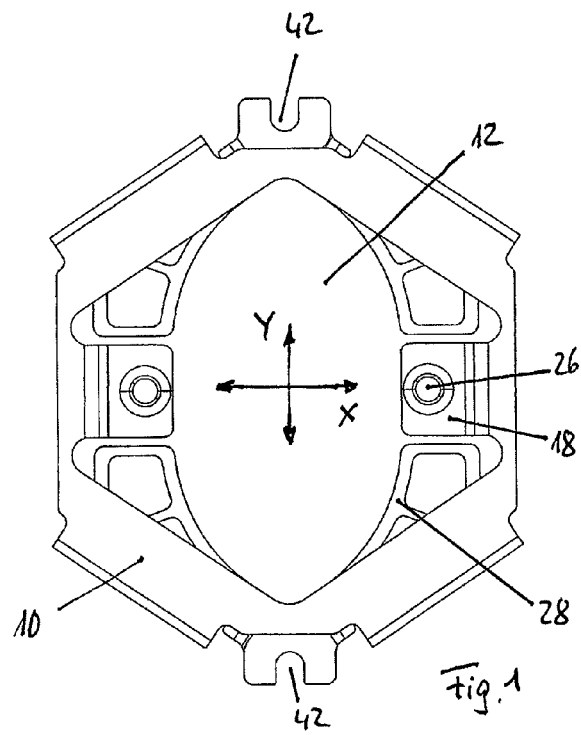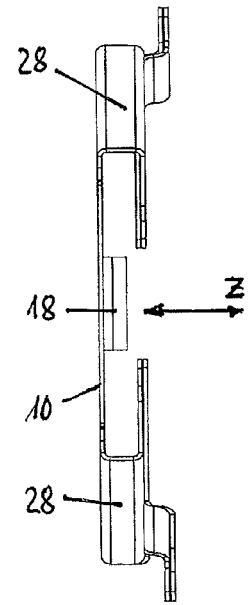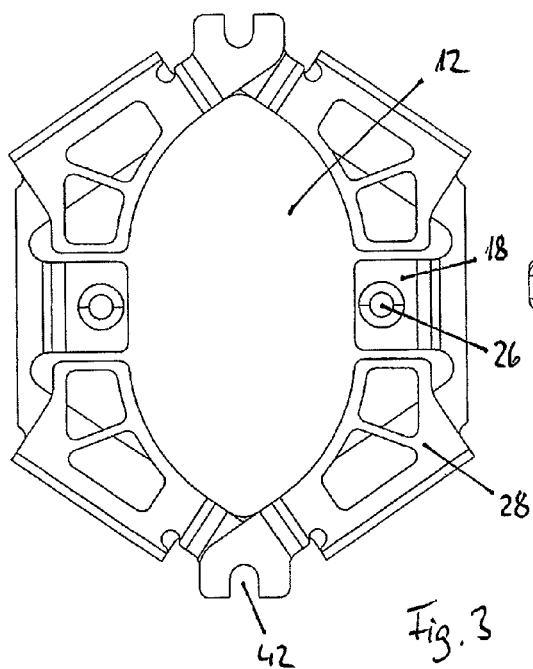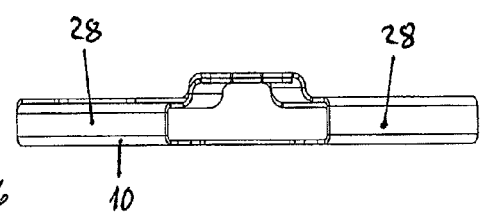
Fig. 1
Fig. 2
Fig. 3
Fig. 4

STATOR COUPLING

BACKGROUND

1. Field

The present disclosure relates to a stator coupling for the torsionally rigid connection of two components which allows radial and axial relative movements within tolerance limits, having a planar base surface, having first lugs which are positioned at the base surface and which have a pair of first assembly points arranged diametrical with respect to one another in a first axis (X axis) for fastening to the one component, and having second lugs which are positioned at the base surface and are bent out of the plane of the base surface and which have a pair of second assembly points arranged diametrical with respect to one another in a second axis (Y axis) for fastening to the other component.

2. Background

Stator couplings of this category are used to connect two components to one another in a torsionally rigid manner, with the stator coupling, however, allowing tolerance-induced radial and axial relative movements of the two components. Such stator couplings are frequently used in rotary encoders which are attached to motors. The rotary encoder shaft is in this respect rigidly connected to the motor shaft to be measured. The sensor supported on the rotary encoder shaft must in this respect be connected in as torsionally rigid a manner as possible to the motor housing. The stator coupling in this respect serves to take up unavoidable misalignments between the rotary encoder shaft and the motor shaft and any possible axial movements of the motor shaft (e.g. due to thermal expansion). The stator coupling can for this purpose be arranged e.g. between the motor housing and the rotary encoder housing or between the rotary encoder housing fixedly mounted at the motor housing and the sensor.

A stator coupling is known from DE 89 15 109 U1 which is manufactured as a single-part stamped and bent part from a spring steel sheet. The stator coupling has a planar base surface of ring-disk shape having a center opening at which pairs of lugs are molded which are arranged diametrically with respect to one another, which are bent out of the plane of the base surface and which have assembly points for fastening to the components. The two pairs of lugs respectively form a spring parallelogram which allows a radial deflection in the plane of the base surface in directions perpendicular to one another. The resiliently flexible lugs influence the angular accuracy of the stator coupling on their elastic deformation.

To improve the torsional rigidity of the stator coupling, in accordance with EP 0 762 081 B1, the lugs each have two assembly points mutually spaced apart in the peripheral direction. The lugs are applied centrally between their two assembly points at the base surface. The double number of assembly points makes the installation of the stator coupling complex. A radial and axial movement of the stator coupling influences the angular accuracy.

A stator coupling is known from EP 1 203 203 B1, in particular FIG. 8, in which the lugs are configured as strips which are arranged in the peripheral direction and which are molded to the base surface at their two ends. The assembly point is in each case arranged centrally at the lugs. This configuration of the lugs improves the torsional rigidity and thus the angular accuracy. The stator coupling, however, only allows very small tolerances with respect to radial and axial movements.

BRIEF DESCRIPTION OF THE DRAWINGS

The present disclosure will be explained in more detail in the following with reference to an embodiment shown in the drawing. There are shown:

FIG. 1 a plan view of the lower side of the stator coupling;
FIG. 2 a side view from the left in FIG. 1;
FIG. 3 a plan view of the upper side of the stator coupling;
FIG. 4 a side view from below in FIG. 3.

DETAILED DESCRIPTION

Overview

Figure 5:
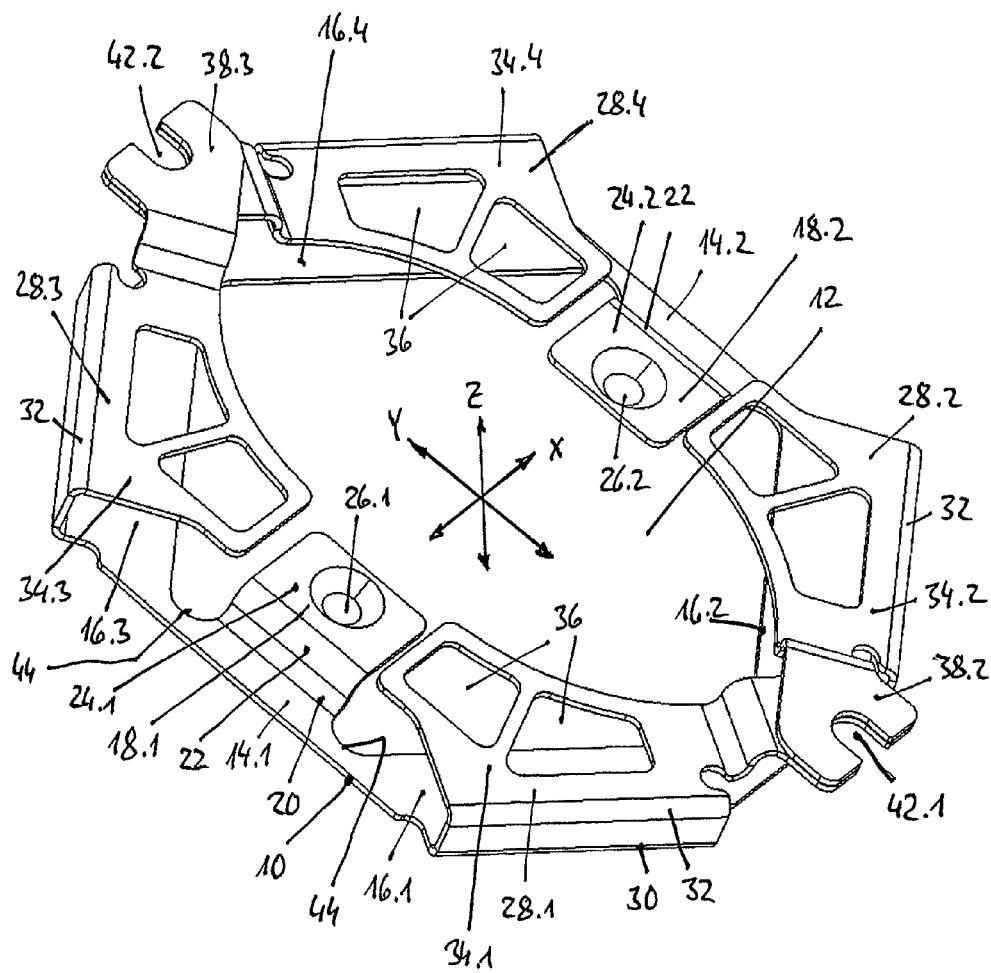
FIG. 5 a perspective representation of the stator coupling.

It is desired to provide a stator coupling which has a high torsional rigidity and thus a high angular accuracy and which can take up large tolerances with respect to radial and axial offset.

This object is satisfied according to the disclosed technology by a stator coupling in which a first axis (X axis) and a second axis (Y axis) extend approximately perpendicular to one another in the plane of a base surface and in which the base surface has respective straight-line edges between the assembly points. A set of second lugs are positioned at straight-line edges of the base surface and bent edges parallel to the respective edge are bent away at least twice, whereby a flange surface-parallel to the base surface is formed. Two respective second lugs, which are positioned at edges following one another in the peripheral direction, overlap with the mutually facing ends of their flanges or are connected thereto and these ends each together have one of the second assembly points.

The present disclosure relates to a stator coupling for the torsionally rigid connection of two components which allows radial and axial relative movements within tolerance limits, having a planar base surface, having first lugs which are positioned at the base surface and which have a pair of first assembly points arranged diametrical with respect to one another in a first axis for fastening to the one component and having second lugs which are positioned at the base surface and are bent out of the plane of the base surface and which have a pair of second assembly points arranged diametrical with respect to one another in a second axis for fastening to the other component, with the first axis and the second axis extending approximately perpendicular to one another in the plane of the base surface and with the base surface respectively having straight-line edges between the assembly points.

In the stator coupling, the base surface has straight-line edges so that the outer contour forms a polygon. The second assembly points are arranged at two respective second lugs which start at edges following one another in the peripheral direction and are bent away out of the plane of the base surface at these edges as a bent edge. The second lugs are bent away again about a second bent edge parallel to the edge so that they end in a flange surface-parallel to the plane of the base surface. The flange is formed by a planar surface and optionally has fastening means. The flanges of the two lugs of the mutually adjoining edges are connected to one another or overlap one another at the corner of the base surface formed by the two edges, with the associated assembly point being formed together at the two overlapping flanges or being arranged at the connection point. The bent edges can be configured so that the flange faces outward angled in a Z shape or S shape. An embodiment is preferred in which the bent edges are configured so that the flange is inwardly directed, whereby an inwardly open U-shaped or C-shaped section results in cross-section for the second lugs.

The twice bent away section of the two lugs extends substantially over the entire length of the edges from the common second assembly point up to the respective adjoining first lug. A respective straight-line connection in the direction of the rotational forcers introduced into the coupling having a high rigidity results between the first assembly points and the second assembly points by this twice bent over section, whereby a correspondingly high rigidity and angular accuracy of the stator coupling is achieved.

The first lugs are simple lugs bent away out of the plane of the base surface and having one respective assembly point. The first lugs can be bent away once perpendicular out of the plane of the base surface if a radial fastening by means of the assembly points is required. Alternatively, the first lugs can be angled inwardly or outwardly so that they have a flange for the assembly points which is surface-parallel to the plane of the base surface provided that an axial fastening of the first lugs is required. The first lugs allow a large radial movement tolerance in the direction of their imaginary diametrical connection line (X axis).

The second lugs have a sufficient radial flexibility due to their twice bent surfaces in order also to take up radial tolerances in the direction of the imaginary connection line (Y axis) of the second assembly points.

In addition, the stator coupling can take up large axial movements such as are required when a rotary encoder is installed at a motor and thermal expansions of the motor shaft have to be compensated. The axial offset which the stator coupling can take up is preferably increased in that the base surface has respective material-reduced desired bending points between the first lugs and the second lugs. These desired bending points allow an elastic, axial mutual deformation of the regions of the base surface which comprise the first lugs and the second lugs. These lugs with their respective assembly points can thus move axially toward one another without hereby an angular displacement of the lugs and thus an angular inaccuracy arising. The material reduction can be achieved in different manners. For example, notches can be introduced into the surface of the base surface which reduce the material thickness of the base surface. A simple realization of the material reduction is achieved in that the width of the base surfaces is reduced by stamped out indentations.

A particularly simple and inexpensive manufacture of the stator coupling is possible when the entire stator coupling is manufactured as a single-part stamped and bent part from a suitable steel sheet. It is, however, also possible to assemble the stator coupling from a plurality of parts so that, for example, the parts forming the lugs are manufactured separately and are then assembled, e.g. welded, with the base surface to form the stator coupling.

EXAMPLES

A first embodiment of the stator coupling will be described in the following with reference to FIGS. 1 to 6.

Figure 6:
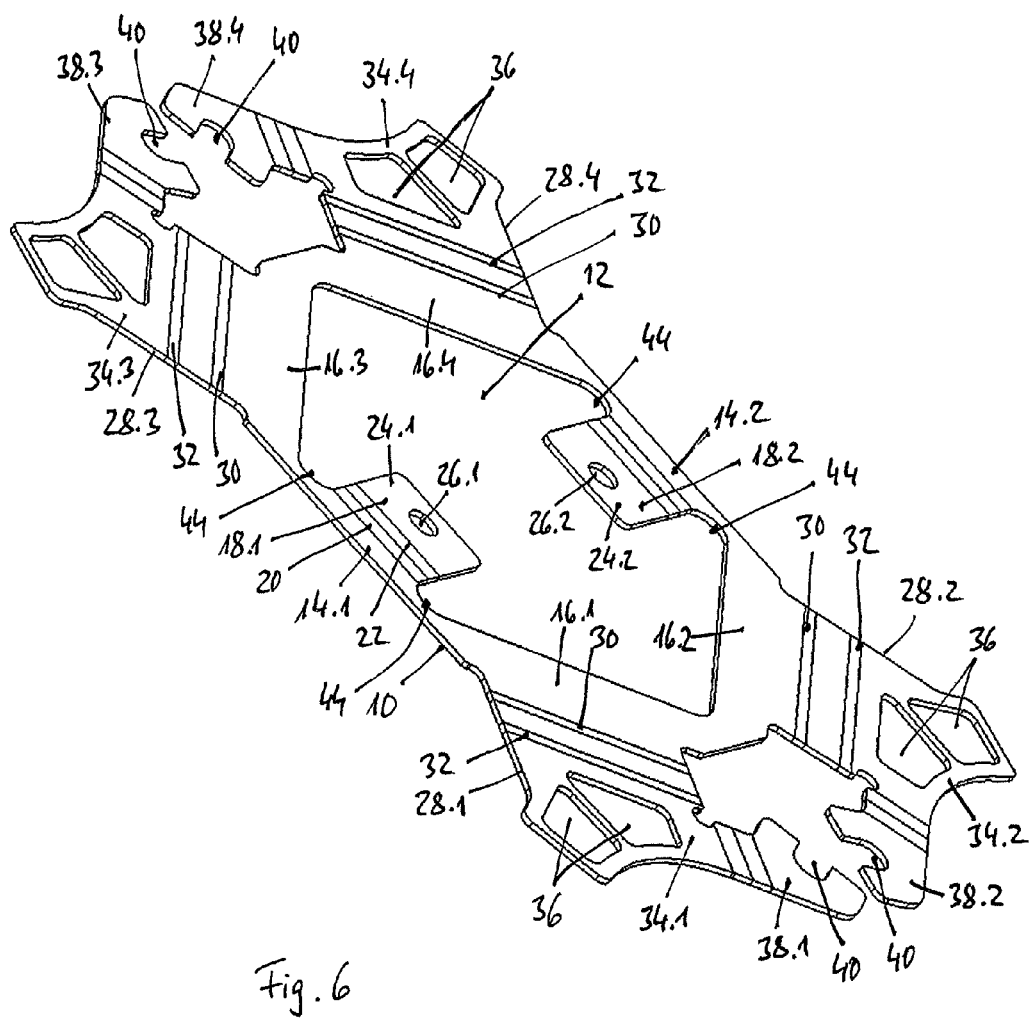
FIG. 6 a stamped part for manufacturing the stator coupling.

In this embodiment, the stator coupling is manufactured as a single-part stamped bent part from a spring-elastic metal sheet, in particular from a spring steel sheet. First, a stamped part is stamped from a planar metal sheet as is shown in FIG. 6. The stator coupling is bent out of this stamped part in the manner described below to obtain the shape shown in FIGS. 1 to 5.

The stator coupling has a planar base surface 10 which has a large-area, central opening 12 through which the rotor elements, not shown, are conducted. The base surface 10 has a polygonal outer contour, a hexagonal outer contour in the embodiment shown. Narrow strips 14 and 16 of the spring sheet material are thereby formed between the outer edges of the base surface 10 and the opening 12. Two first strips 14.1 and 14.2 extend in parallel to one another and are spaced apart in a first X-axis disposed in the plane of the base surface 10. Second strips 16.1 and 16.2 adjoin the first strips 14.1 and 14.2 at one end and second strips 16.3. and 16.4 adjoin at the other end. The second strips 16.1 and 16.2 extend in a straight line and contact one another in a polygonal corner at an angle of approximately 80° to 120°. The second strips 16.3 and 16.4 likewise extend in a straight line and contact one another at an angle in a polygonal corner. The strips 16.1 and 16.2 and the strips 16.3 and 16.4 are mirror images with respect to the X axis so that the polygonal corner of the second strips 16.1 and 16.2 and the polygonal corner of the second strips 16.3 and 16.4 lie diametrical to one another on a Y axis which extends perpendicular to the X axis.

A respective first lug 18.1 or 18.2 is respectively positioned at the first strips 14.1 and 14.2. The first lugs 18 are molded in one piece to the base surface 10. In the embodiment shown, the first lugs 18 are arranged so that they are positioned at the side of the opening 12 inwardly at the respective first strip 14. The first lugs 18 are bent up by a first bent edge 20 parallel to the edge of the first strips 14 out of the plane of the base surface 10. The lugs 18 are in turn inwardly bent away about a second bent edge 22 parallel to the first bent edge 20 so that they run out in a flange 24.1 or 24.2 respectively which extends surface-parallel to the base surface 10. A respective first assembly point 26.1 or 26.2 is provided in the flanges 24.1 and 24.4 and is designed e.g. as a bore for a screw fastening of the stator coupling. The first assembly points 26.1 and 26.2 lie diametrical with respect to one another on the X axis.

In the embodiment shown, the first lugs 18 are positioned at the inner edge of the first strips 14 and are bent in Z shape so that the flanges 24 are directed inwardly into the opening 12. Alternative embodiments are possible. The first lugs 16 can also be bent in S shape or in U shape and can also be positioned at the outer edge of the first strips 14. In all these cases, the first assembly points 25 lie in a flange 25 which extends surface-parallel to the plane of the base 16. The first assembly points 26 in this respect serve for an axial fastening of the stator coupling to a component. An alternative is also possible in which the first lugs 18 are only bent out of the base surface 10 by a first bent edge 20 so that they are substantially perpendicular to the plane of the base surface 10. The first assembly points 26 of the first lugs 18 in this embodiment serve for a radial fastening of the stator coupling by means of the first lug 18 at one of the components to be connected to one another.

Respective second lugs 28.1, 28.2, 28.3 and 28.4 are positioned in one piece at the second strips 16.1, 16.2, 16.3 and 16.4. In the embodiment shown, the second lugs 28 are each positioned at the outer edges of the second strips 16 of the base surface 10.

The second lugs 28 are each bent away by a first bent edge 30 out of the plane of the base surface 10, with this first bent edge 30 coinciding with the straight-line outer edge of the respective side strip 16. The second lugs 28 are then bent by a second bent edge 32 which extends in parallel to the first bent edge 30 and thus to the outer edge of the strip 16. Flanges 34 surface-parallel to the base surface 10 result due to the double bending away of the second lugs 28. In the embodiment shown in the drawing, the first bent edges 30 and the second bent edges 32 are configured so that the flanges 34 are directed inwardly toward the opening 12 so that a U section or C section inwardly open toward the opening 12 results overall for the second lugs 28. Alternatively, the second lugs 28 can also be bent in Z shape or in S shape so that the flanges 34 are directed outwardly.

The bent edges 30 and 32 of the second lugs 28 extend over the total length of the respective strip 16 so that a high longitudinal rigidity results in the direction of the second strips 16 together with the twice bent section cross-section of the second lugs 28.

To save material and to reduce weight, the flanges 34 have surface openings 36 so that the flanges 34 are substantially formed by the braces effecting longitudinal rigidity.

The flanges 34.1 and 34.2 each have a flap 38.1 and 38.2 respectively molded in one piece at their mutually facing ends. If the second lugs 28 are bent to their U-shaped section, the flaps 38.1 and 38.2 overlap in the polygonal corner. In the overlapping region of the flaps 38.1 and 38.2, they come into coverage with respective cut-outs 40.1 and 40.2. The overlapping cut-outs 40.1 and 40.2 form a common second assembly point 42.1 for the second lugs 28.1 and 28.2. The flanges 34.3 and 3.4.4 overlap with specular symmetry with mutually facing flaps 38.3 and 38.4 whose respective cut-outs 40.3 and 40.4 form a common second assembly point 42.2 for the second lugs 28.3 and 28.4. The second assembly points 42.1 and 42.2 lie diametrical to one another on the Y axis. The second assembly points 42.1 and 4.2. serve for fastening the stator coupling to the other one of the two components. The fastening can e.g. take place by screws inserted into the cut-outs 40.

The flaps 38 can optionally be bent up angled out of the plane of the flanges, whereby a vertical adaptation on the installation of the stator coupling is possible.

The stator coupling allows a mutual radial movement of the components in the X axis connected by the stator coupling due to the spring parallelogram formed by the first lugs 18. The second lugs 28 allow a radial movement of the mutually connected components in the Y axis. In this respect, the flexibility of the second lugs 28 is sufficient due to the two bent edges 30 and 32 to allow a tolerance balance in the radial direction of the Y axis. The high longitudinal rigidity of the U-shaped section of the second lugs 38 in this respect ensures a high rigidity in the direction of the connection lines between the first assembly points 26 and the second assembly points 42 so that the stator coupling has a high torsional rigidity overall and effects a conformal coupling of the two components with high accuracy.

The base surface 10 takes up any axial offset in the Z axis perpendicular to the plane of the base surface 10 arising on the coupling of the two components in the transition region between the first strip 14.1 and the adjacent second strips 16.1 and 16.3 as well as between the first strip 14.2 and the adjacent second strips 16.2 and 16.4 by elastic deformation. The elastic deformability of the base surface 10 in these regions can be further improved it that a material reduction is provided in these regions which reduces the deformation cross-section of the base surface 10 in these regions. Such a material reduction can be effected, for example, by notches introduced into the surface 10. The material reduction is preferably achieved by indentations 44 which reduce the width of the first strips 14.1 and 14.2 at both sides of the first lug 18.1 and 18.2 respectively These indentations 44 can already be manufactured on the stamping of the openings 12 of the stamped part shown in FIG. 6. Desired bending points are produced by the material reduction at both sides of the first lugs 18 which allow a high axial offset between the first lugs 18 and the second lugs 28 and thus between the components connected by the stator coupling without an angular error thereby occurring between the first assembly points 26 and the second assembly points 42 and thus between the components connected by the stator coupling.

In the embodiment shown in FIGS. 1 to 6, the stator coupling is manufactured as a single-piece stamped bent part or as a single-piece laser welded part. This embodiment is advantageous with respect to the manufacturing costs and the mass of the stator coupling. The advantages of the high angular rigidity and of the low angular errors, in particular also with large axial offsets, can, however, also be achieved with a multipart design. On such a multipart design, for example, the base surface 10 is manufactured as a separate stamped part. The lugs 18 and 28 can likewise be manufactured as separate stamped bent parts and can be fastened to the base surface 10; they can in particular be welded onto the base surface 10, for example. It is equally possible to position the first lugs 18 or the second lugs 28 in one piece at the base surface 10 and to manufacture the respective other lugs as separate stamped bents parts and to fasten them to the base surface 10.

Figure 7:
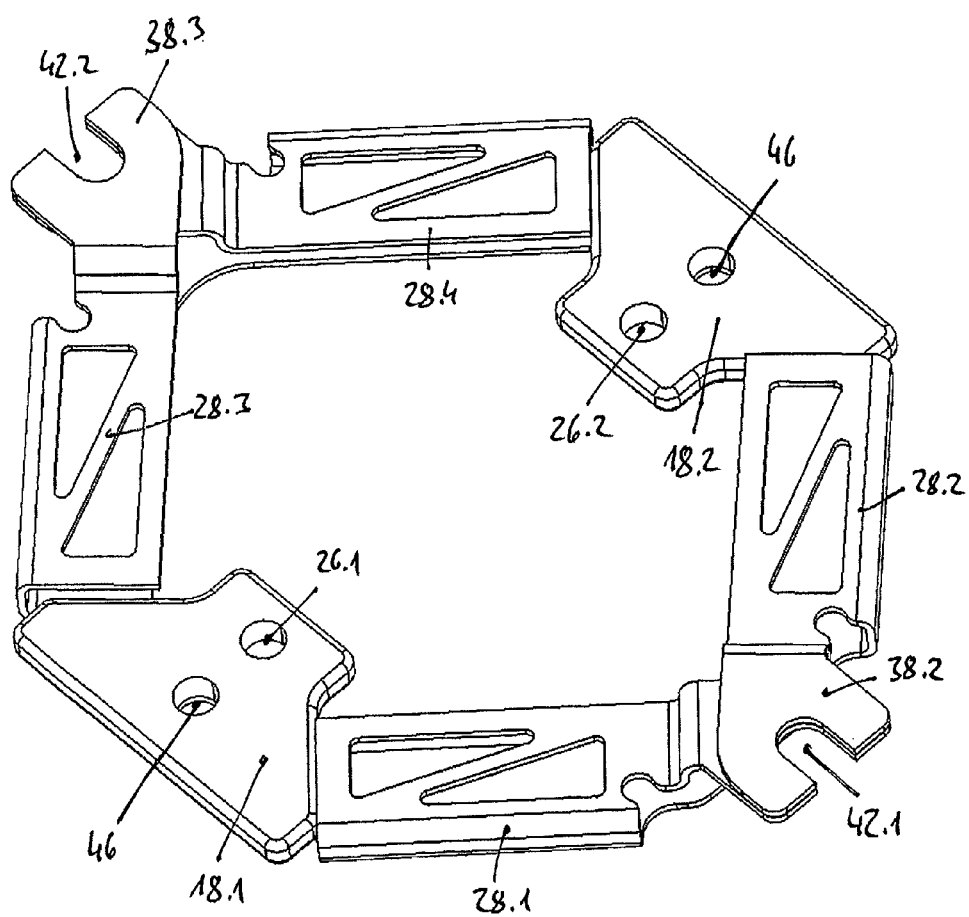
FIG. 7 a perspective view of the stator coupling in a modified embodiment from above.
Figure 8:
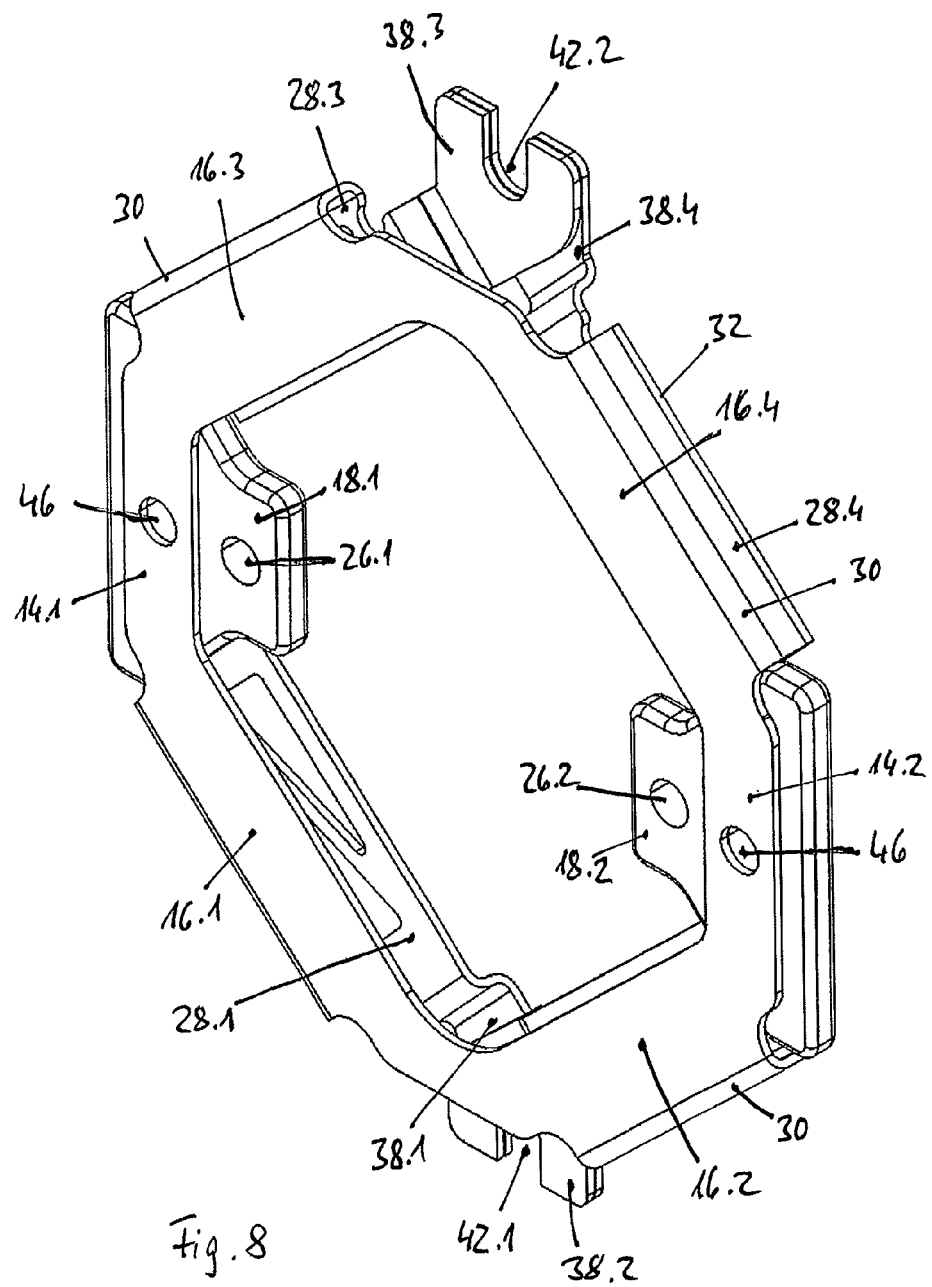
FIG. 8 the stator coupling in accordance with FIG. 7 from below.

An example of such a multipart embodiment is shown in FIGS. 7 and 8. To the extent that this embodiment coincides with the above-described embodiment of FIGS. 1 to 6, reference is made to the preceding description which also applies to the embodiment of FIGS. 7 and 8.

In the embodiment of FIGS. 7 and 8, the base surface 10 is manufactured with the second lugs 28 as a single-piece stamped bent part as is described above. The first lugs 18, however, are not positioned at the first strips 14 in this multipart embodiment, but are rather manufactured as separate stamped bent parts. These separately manufactured first lugs 18.1 and 18.2 are each placed onto the narrow second strips 14.1 and 14.2 respectively and are fastened to the strips 14.1 and 14.2 by means of weld spots 46.1 and 46.2 respectively.

The separate manufacture of the first lugs 18 and/or also of the second lugs 28 and the subsequent fastening of these lugs to the base surface 10 mean a somewhat higher manufacturing effort. However, this higher effort can optionally be compensated in that the separately manufactured first lugs 18 and/or second lugs 28 can be designed differently and can be connected to a uniform single-piece stamped bent part which comprises the base surface 10 and lugs 18 and 28 respectively optionally positioned in one piece at this base surface 10. In the embodiment of FIGS. 7 and 8, for example, a series of stator couplings can thus be manufactured which all coincide uniformly in the base surface 10 and the second lugs 28 positioned in one piece thereat, in which, however, the separately manufactured lugs 18 welded to the base surface 10 have a different design. It is thereby possible to match the stator coupling to different applications in a favorable manner. If, for example, the stator coupling is used to install the housing of a rotary encoder with torsional rigidity to the housing of a motor, the base surface 10 and the lugs serving for the installation at the rotary encoder housing can be manufactured uniformly in one piece, while the adaptation for the installation at different motor types is made possible by separately manufactured different lugs welded to the base surface 10.

The stator coupling cannot only take up large radial offsets, but also large axial offsets in a large tolerance range, with only very small angular errors occurring. The stator coupling has a small mass and thus only a small angular inertia. Due to this small angular inertia or small mass, the stator coupling is in particular suitable for use in rotary encoders in regulation systems. The rotary encoder as a sensor of the regulation system can react fast and with a high resonant frequency to speed changes of the motor so that a "hard" regulation is possible.

REFERENCE NUMERAL LIST 10 base surface
12 opening
14 first strips
16 second strips
18 first lugs
20 first bent edge of 18
22 second bent edge of 18
24 flange of 18
26 first assembly point
28 second lugs
30 first bent edge of 28
32 second bent edge of 28
34 flanges of 28
36 flange openings
38 flaps
40 cut-outs
42 second assembly point
44 indentations
46 weld spots

The invention claimed is:

1. A stator coupling for the torsionally rigid connection of two components which allows radial and axial relative movements within tolerance limits, the stator coupling comprising:
   a planar base surface (10);
   first lugs (18.1, 18.2) which are positioned at the base surface (10) and which have a pair of first assembly points (26.1, 26.2) arranged diametrical with respect to one another in a first axis for fastening to the one component, the first axis is an X axis;
   second lugs (28) which are positioned at the base surface (10) and are bent out of the plane of the base surface (10) and which have a pair of second assembly points (42.1, 42.2) arranged diametrical with respect to one another in a second axis for fastening to the other component, the second axis is a Y axis,
   wherein the first axis and the second axis extend approximately perpendicular to one another in the plane of the base surface (10) and wherein the base surface (10) has a polygonal contour and has respective straight-line edges between the first assembly points and the second assembly points (26, 42),
   the second lugs (28.1, 28.2, 28.3, 28.4) are positioned at the straight-line edges of the base surface (10) and bent edges (30, 32) parallel to the respective edge are bent away at least twice, whereby a flange (34.1, 34.2, 34.3, 34.4) surface-parallel to the base surface (10) is formed,
   and two respective second lugs (28.1 and 28.2 or 28.3 and 28.4 respectively), which are positioned at edges following one another in the peripheral direction, overlap with the mutually facing ends of their flanges (34.1 and 34.2 or 34.3 and 34.4 respectively) and these ends each together have one of the second assembly points (42.1 and 42.2 respectively).

2. The stator coupling in accordance with claim 1, wherein the first lugs are bent away perpendicular out of the plane of the base surface.

3. The stator coupling in accordance with claim 1, wherein the first lugs are inwardly or outwardly angled so that they have a flange for the assembly points which is surface-parallel to the plane of the base surface.

4. The stator coupling in accordance with claim 1, wherein the first lugs (18.1, 18.2) start at two mutually oppositely disposed parallel sides of the base surface (10); and wherein the second lugs (28.1, 28.2 and 28.3, 28.4 respectively) are positioned at the sides of the base surface (10) contacting one another at two mutually opposite corners.

5. The stator coupling in accordance with claim 1, wherein the base surface (10) has a hexagonal contour.

6. The stator coupling in accordance with claim 1, wherein the base surface (10) has a respective material-reduced desired bending point between the first lugs (18.1 or 18.2 respectively) and the second lugs (28.1 and 28.3 or 28.2 and 28.4 respectively).

7. The stator coupling in accordance with claim 6, wherein the material-reduced desired bending point is respectively formed by indentations (44) arranged at both sides of the first lugs (18.1, 18.2) which indentations reduce the material width of the base surface (10).

8. The stator coupling in accordance with claim 1, wherein the base surface (10) is manufactured with the first lugs (18) and second lugs (28) positioned at it as a single-piece stamped bent part or as a single-piece laser welded part.

9. The stator coupling in accordance with claim 1, wherein the first lugs (18) and/or the second lugs (28) are manufactured separately and are fastened to the base surface (10).

10. The stator coupling in accordance with claim 1, wherein the first lugs (18) and/or the second lugs (28) are manufactured separately and are welded to the base surface (10).

11. The stator coupling in accordance with claim 1, wherein the flanges (34) of the second lugs (28) have surface openings (36) for a mass reduction.

12. The stator coupling in accordance with claim 1, wherein the second lugs (28) start at straight-line outer edges of the base surface (10).

13. The stator coupling in accordance with claim 1, wherein the second lugs (28) are bent to form a U-shaped or C-shaped section open toward the center of the stator coupling.

14. The stator coupling in accordance with claim 1, wherein the second lugs (28) extend from the respective second assembly point (42) as a planar surface up to the respective adjacent first lug (18).

* * * * *